United States Patent
Wilkins et al.

(10) Patent No.: US 9,505,557 B2
(45) Date of Patent: Nov. 29, 2016

(54) TRANSMISSION HAVING VARIABLE OUTPUT ORIENTATION AND CABLE DIVERT MECHANISM

(71) Applicant: Intelligrated Headquarters, LLC, Mason, OH (US)

(72) Inventors: John Joseph Wilkins, Erlanger, KY (US); Frederick Van Keuren, Batavia, OH (US)

( * ) Notice: Subject to any disclaimer, the term of this patent is extended or adjusted under 35 U.S.C. 154(b) by 0 days.

(21) Appl. No.: 14/617,918

(22) Filed: Feb. 9, 2015

(65) Prior Publication Data
US 2016/0229638 A1    Aug. 11, 2016

(51) Int. Cl.
| | | |
|---|---|---|
| *B65G 47/54* | (2006.01) | |
| *B65G 13/10* | (2006.01) | |
| *B65G 23/02* | (2006.01) | |
| *B65G 13/06* | (2006.01) | |

(52) U.S. Cl.
CPC ............ *B65G 13/10* (2013.01); *B65G 13/065* (2013.01); *B65G 23/02* (2013.01); *B65G 47/54* (2013.01)

(58) Field of Classification Search
CPC ...... B65G 23/02; B65G 39/20; B65G 17/24; B65G 17/16; B65G 17/48; B65G 13/10; B65G 47/54
USPC .................................................... 198/370.09
See application file for complete search history.

(56) References Cited

U.S. PATENT DOCUMENTS

| | | | | |
|---|---|---|---|---|
| 4,180,150 A * | 12/1979 | Moore | ............... | B65G 13/10 193/35 MD |
| 4,509,636 A * | 4/1985 | Godbois | ............... | B65G 13/10 198/370.09 |
| 4,792,034 A * | 12/1988 | Leemkuil | ............... | B65G 47/54 198/370.09 |
| 5,086,906 A * | 2/1992 | Ludke | ............... | B65G 13/10 198/369.5 |
| 5,333,722 A * | 8/1994 | Ouellette | ............... | B65G 13/10 198/436 |
| 5,335,780 A * | 8/1994 | Watson | ............... | B65G 13/10 198/787 |
| 5,921,374 A * | 7/1999 | Takino | ............... | B65G 13/10 193/35 MD |
| 6,571,937 B1 * | 6/2003 | Costanzo | ............... | B65G 13/10 198/370.03 |
| 6,968,941 B2 * | 11/2005 | Fourney | ............... | B65G 17/08 198/370.03 |
| 7,040,478 B2 * | 5/2006 | Ehlert | ............... | B65G 13/10 198/369.4 |
| 2003/0234155 A1 * | 12/2003 | Kanamori | ............ | B65G 1/0478 198/394 |
| 2014/0116841 A1 * | 5/2014 | Wilkins | ............... | B65G 13/065 198/369.1 |

\* cited by examiner

*Primary Examiner* — Thomas Randazzo

(57) ABSTRACT

A conveying surface is defined by outputs with respective orientations that can be varied while maintaining the input in a constant orientation, and which can be used to more than a single direction. Power may be transmitted from a source of linear power to the conveying surface through rotation about an axis perpendicular to the conveying surface. A cable divert mechanism can change the respective orientations of the outputs to divert articles onto more than a single direction.

20 Claims, 14 Drawing Sheets

TRANSMISSION HAVING VARIABLE OUTPUT ORIENTATION AND CABLE DIVERT MECHANISM

BACKGROUND

The present disclosure relates generally to transmissions, and is particularly directed to a transmission in which the output orientation can be varied. The innovation will be specifically disclosed in connection with material handling systems utilizing such variable output orientation transmissions for conveying articles.

Typically the output of a mechanical transmission has a fixed orientation relative to the orientation of the input. Occasionally, though, in many situations there is a need to vary the output orientation relative to the input orientation. One such situation arises with material handling systems.

With material handling systems, it is known to utilize a conveyor to transport a succession of articles along a desired path, to merge or combine a plurality of conveying paths to fewer paths, or to selectively direct articles to respective desired or selected locations or desired paths. For example, sortation conveyors in which articles may be selectively conveyed from the sortation conveyor onto another conveyor or to a desired intermediate or ultimate location by pushers, arms, pop up wheels, cross belts, tilt trays or other suitable structures. Configurations in which articles are selectively directed to one of a plurality of paths from a single conveyor include pick and pass, carton sequencing, work cell and single sort to multiple location configurations. Other examples include aligning conveyors, switching conveyors and merging conveyors. Conveyors are also used to engage sides of articles being transported.

Many different configurations are known for the conveying surface of a single conveyor, such as an endless conveying belt, moving slats or tubes, cross belts, tilt trays, and rollers to name a few. An example of rollers includes elongated cylindrical rollers which may be self-driven, such as a motorized drive roller, or driven by an underlying endless belt urged into contact with the rollers. Another example of rollers include individual spaced apart wheels having a small width relative to their diameters which may also be driven by an underlying endless belt urged into contact with the wheels. The circumference of such rollers may be flat, i.e., cylindrical, or arcuate which may have a constant radius, i.e., spherical, or may not.

It is known to configure the conveyor system to be capable of selectively directing articles from the conveying surface so as to following one of a plurality of paths therefrom. Examples of such configurations include a pusher and swinging arm to engage the article and push it sideways. For moving slats or tubes, a traveling pusher configuration may be used. Crossbelt and tilt tray conveyors have individual sections that move as the conveyor and which are selectively actuated to cause the article thereon to move laterally until being discharged therefrom. Conveyors having wheels or elongated rollers may have laterally disposed conveying structures interposed therebetween at divert locations to cause the article to travel laterally onto the desired path. The conveying structures can comprise a plurality of driven divert wheels that can drive articles along the conveying surface, or pivot as a group to drive articles onto an adjacent path. In most such configurations, articles may either continue to move along the main conveyor or can be discharged laterally from the main conveyor onto the desired path. In some configurations, the divert wheels can be mounted in a substantially flat table top with a portion of the divert wheels protruding from the table top. What is needed is a cable divert mechanism that can pivot a plurality of drive rollers as a group.

Although one or more embodiments will be described herein in connection with variable output orientation transmissions used in material handling systems, it will be understood that the present innovation is not limited in use or application thereto. The teachings of the present innovation may be used in any application in which variable output orientation transmissions may be beneficially used.

BRIEF DESCRIPTION OF THE DRAWINGS

The accompanying drawings, which are incorporated in and constitute a part of this specification, illustrate embodiments of the innovation, and, together with the general description of the innovation given above, and the detailed description of the embodiments given below, serve to explain the principles of the present innovation.

Figure 1:
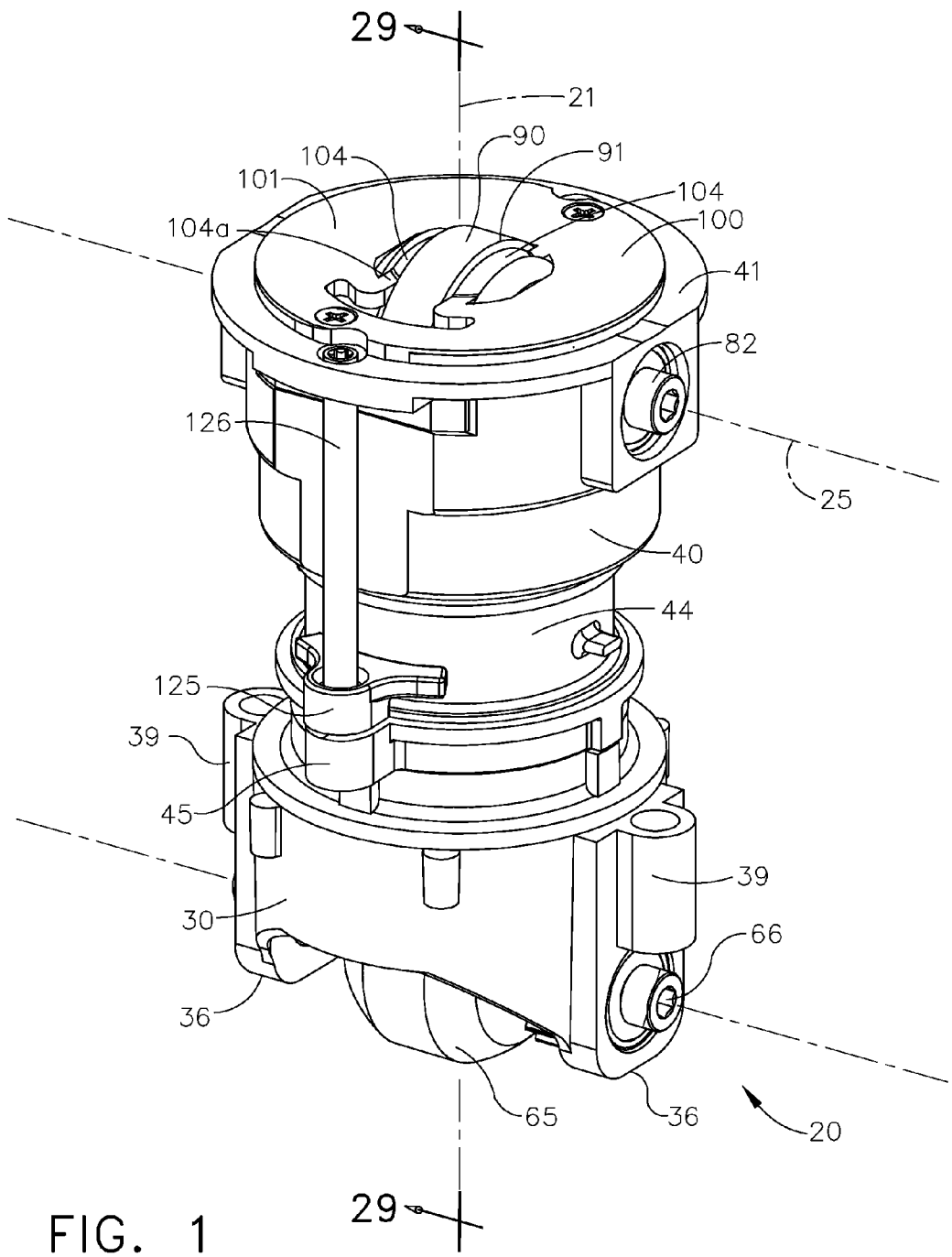
FIG. 1 is a side perspective view of a variable output orientation transmission constructed in accordance with the teachings of the present innovation

Reference will now be made in detail to one or more embodiments of the innovation illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the innovation will now be described.

Figure 2:
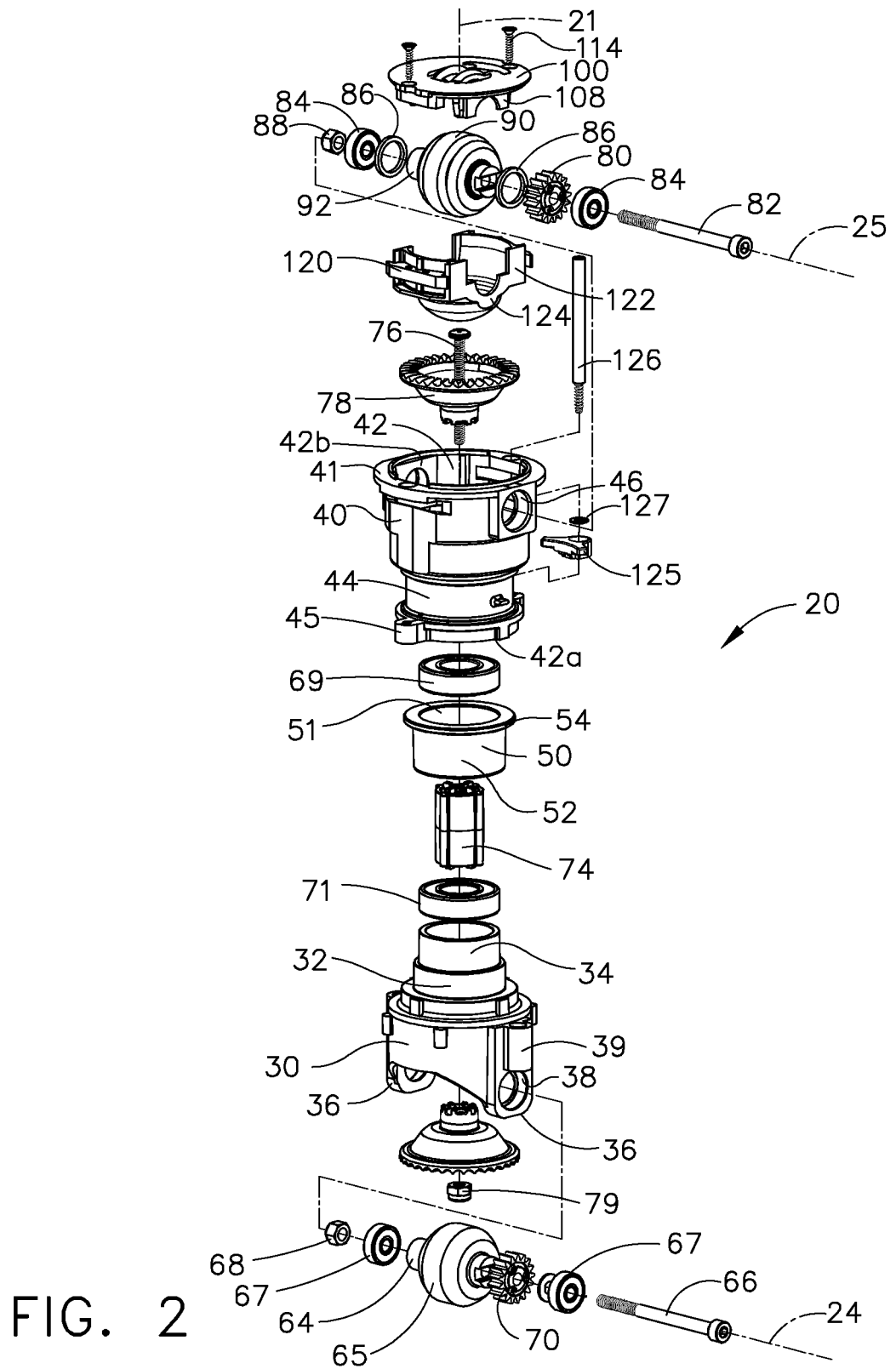
FIG. 2 is an exploded perspective view the transmission of FIG. 1 constructed in accordance with the teachings of the present innovation.

FIGS. 1-12 depict a drive or transmission 20 that is an alternate embodiment of transmissions 2 found in co-pending U.S. non-provisional application Ser. No. 14/063,400, titled Transmission Having Variable Output Orientation, which was filed on Oct. 25, 2013 by John Joseph Wilkins, which is hereby incorporated by reference in its entirety. Each of a plurality of transmissions 20 comprises an output roller 90 embedded into a body (first housing 30, second housing 40, cap 100) of the transmission 20 with an exposed portion 91 of the output roller 90 extending above a top surface 101 of the transmission 20 to define the conveying surface. Output rollers 90 can be rotatably driven with a power source to convey articles thereon FIGS. 13-19 shows embodiments of a cable divert mechanism 148 of the present innovation that engages with one or more transmissions 20 to rotate each output roller 90 about first axis of rotation 21. Each output roller 90 is rotatable about first axis 21 of rotation perpendicular to the conveying surface to divert articles conveyed thereon from the first direction to the second direction FIG. 1 is an isometric view and FIG. 2 is an exploded view of transmission 20. Transmission 20 has a cylindrical body and a narrow waist, and comprises second housing 40 rotatably mounted on a fixed first housing 30. In the embodiment depicted, first housing 30 is a hollow multi-stepped cylinder that is wide at the base and has progressively smaller cylinders moving towards the top. First outer surface 32 is a cylindrical surface positioned midway on housing 30 and second outer surface 34 is a smaller cylindrical surface positioned at the top. Shoulders 36 extend downward from the wide base with bearing bores 38 extending within. Mounting bosses 39 are positioned above each bearing bore 38 for fixing first housing 30.

In the embodiment depicted, second housing 40 is a hollow multi-stepped cylinder that is wide at the top and narrow at the base. Stepped bore 42 extends therethrough and comprises lower bore 42a at the narrow end and upper bore 42b at the wide end. Clamp boss 45 extends from either side and has a threaded bore within. Second housing 40 rotatably mounts on first housing 30 and forms a rotatable coupling therewith when first outer surface 32 is rotatably received in lower bore 42a. Flanged sleeve 50 inserts into second housing 40 from the top to bring sleeve bore 51 into secure engagement with second outer surface 34 of first housing 30. This insertion also brings sleeve surface 52 into rotatable engagement with lower bore 42a of second housing 40. First outer surface 32 of the first housing 30 and sleeve surface 52 of the flanged sleeve 50 form a rotatable coupling with lower bore 42a of second housing. The rotation of the upper housing 40 about the lower housing 30 defines a vertical or first axis 21 and the rotatable coupling is free to rotate without binding. Flange 54 of secured flange sleeve 50 prevents upward movement of upper housing 40 relative to lower housing 30. Flanged sleeve 50 may be secured to first housing 30 in any suitable manner, such as with an adhesive but not limited thereto.

Figure 3:
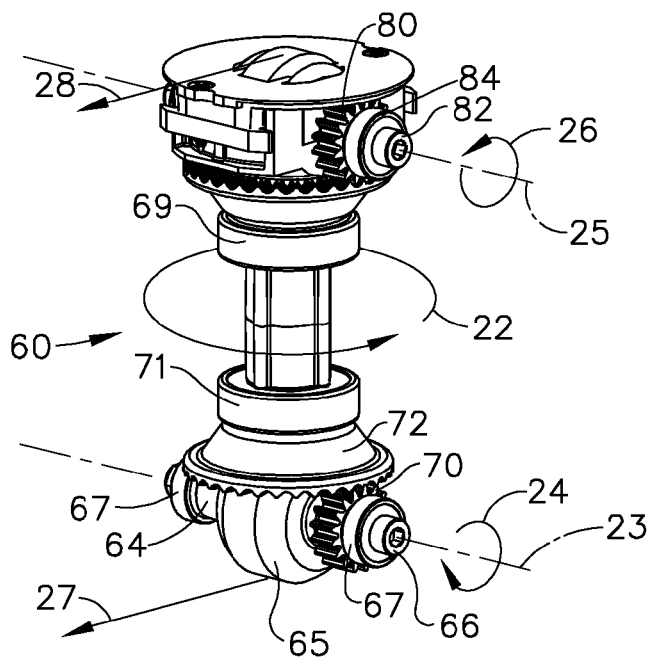
FIG. 3 is a perspective view of the drive train of the transmission of FIG. 1 constructed in accordance with the teachings of the present innovation.
Figure 4:
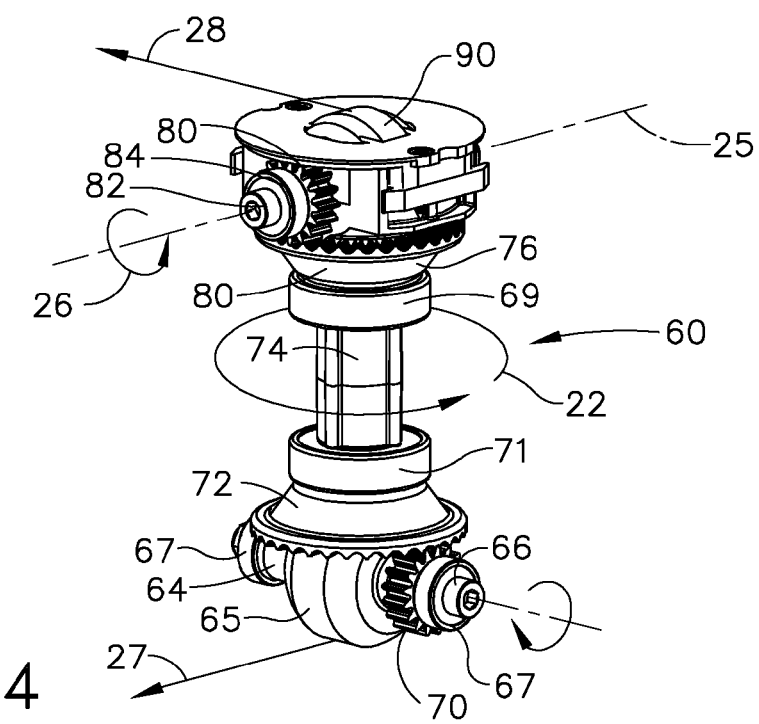
FIG. 4 is a perspective view of the drive train of the transmission of FIG. 3 with an output roller rotated 90 degrees from the position of FIG. 3 constructed in accordance with the teachings of the present innovation.
Figure 17:
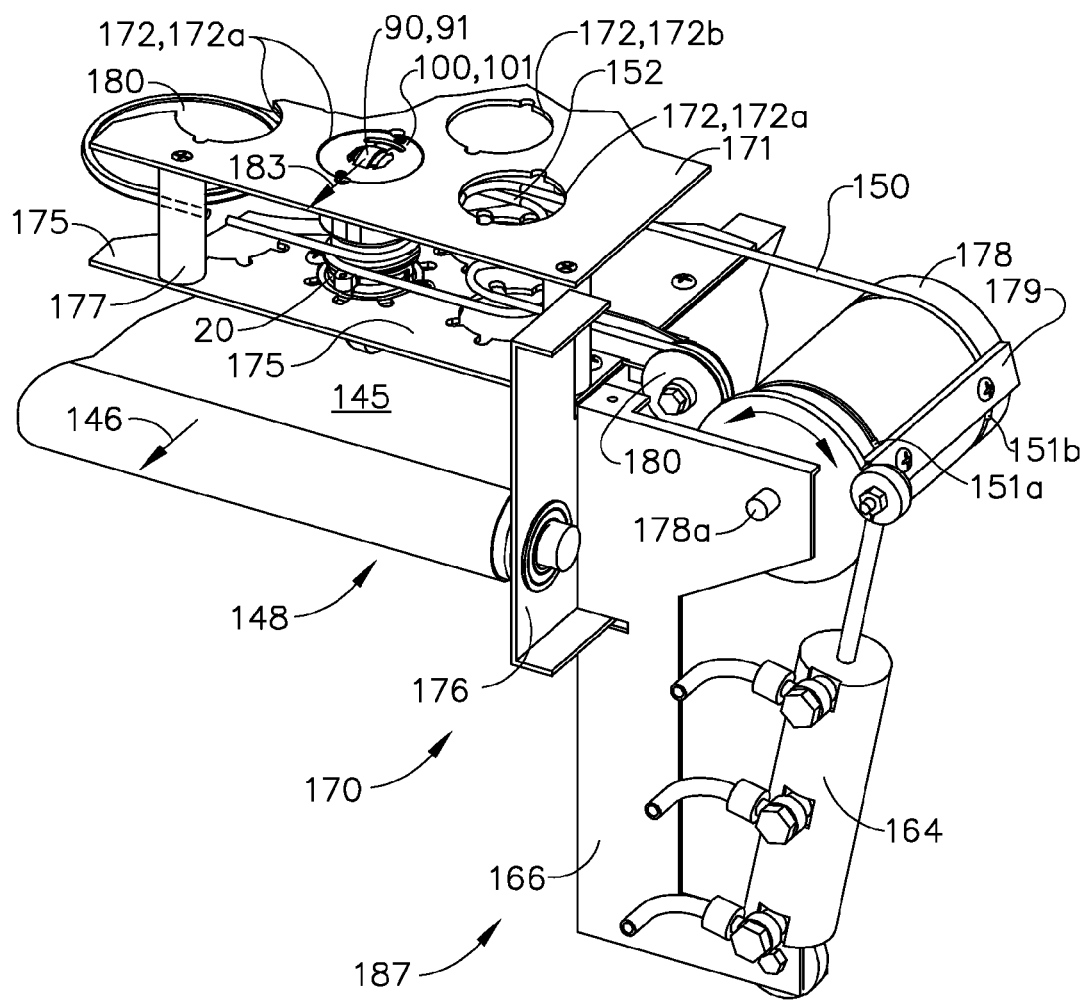
FIG. 17 is a perspective view of the cable divert mechanism installed in a table and configured to rotate a plurality of output rollers from a first position constructed in accordance with the teachings of the present innovation.
Figure 18:
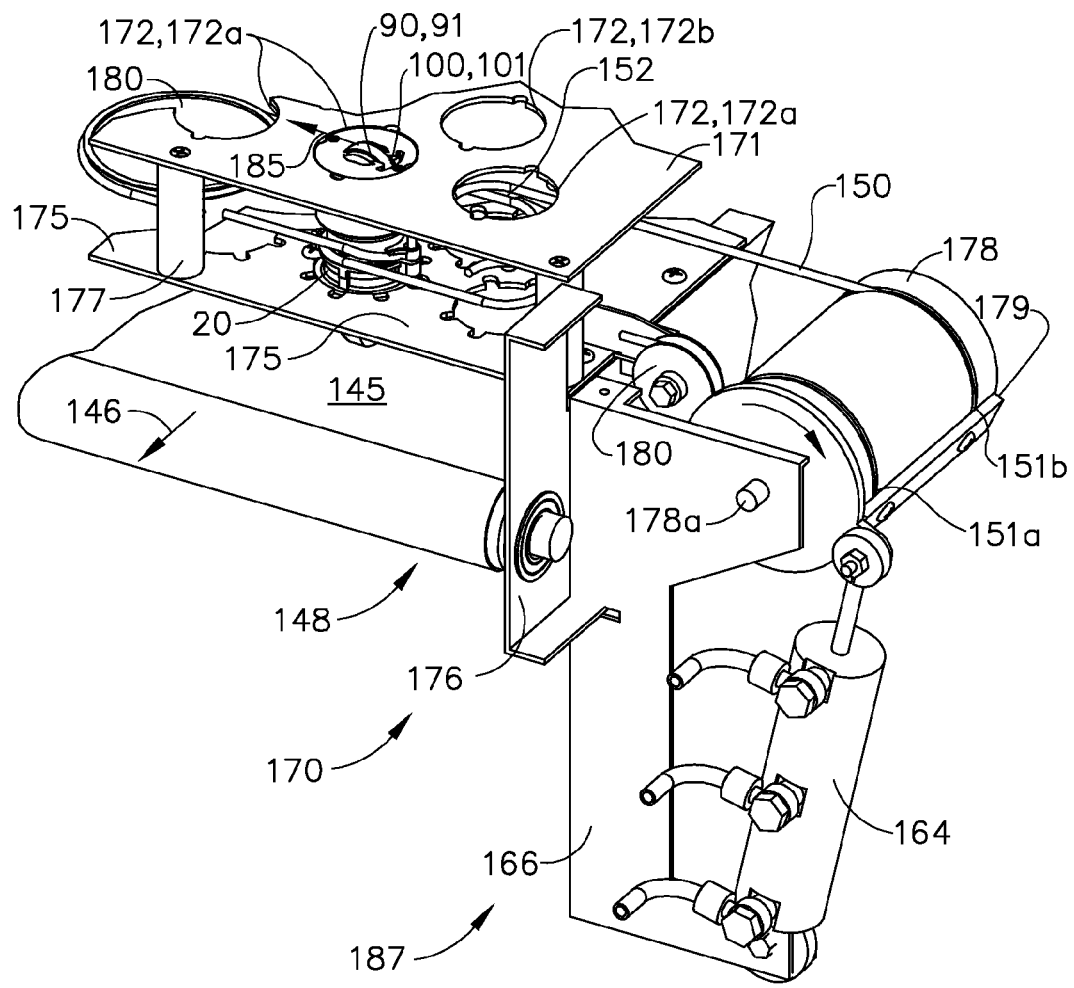
FIG. 18 is a perspective view of the cable divert mechanism installed in a table after rotating the plurality of output rollers to a second position that is 90 degrees from the first position constructed in accordance with the teachings of the present innovation.
Figure 19:
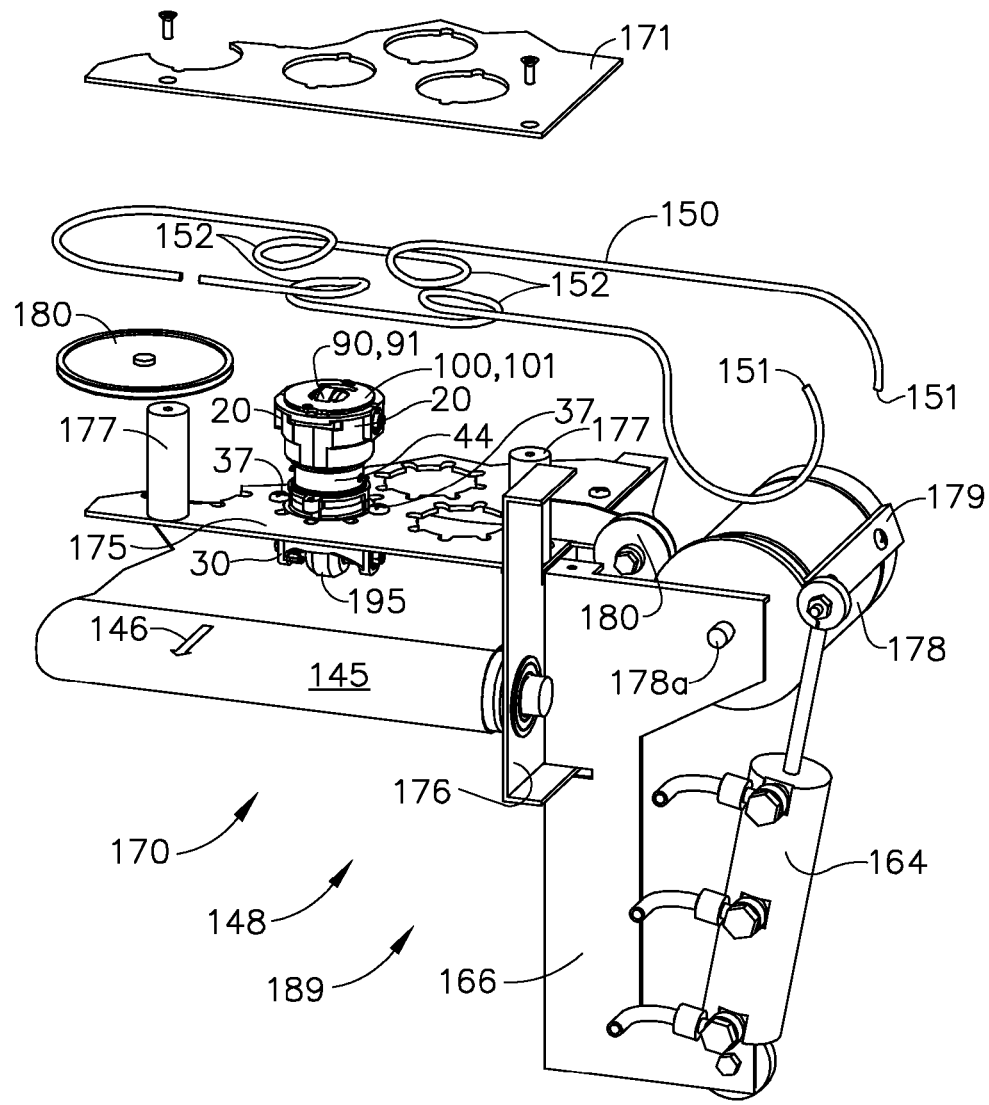
FIG. 19 is a diagrammatic perspective view of the cable divert mechanism with elements of the table shown exploded for clarity constructed in accordance with the teachings of the present innovation.

FIGS. 3-4 show drive train 60 that mounts within first housing 30 and second housing 40. Drive train 60 is configured to convert input linear motion moving in a first plane in a first direction into output linear motion directed in any direction on a second plane. As shown in FIGS. 17-19, the linear output motion can be provided by a linearly moving belt 145 powered by a power source. The linear output motion of the belt 145 can be transferred to drive 20 by placing input roller 65 into contact therewith. The first and second plane need not be parallel. As shown in FIGS. 3-4, input linear motion (arrow 27) rotates input roller 65 clockwise (arrow 24) around horizontal axis 23. Pinion 70 is rotated by input roller 65 and rotates first bevel 72 counterclockwise (see first axis rotational direction arrow 22) around first axis 21. Coupling 74 transmits the counterclockwise rotation of first bevel 72 to second bevel 76. Second bevel 76 transmits rotation (first axis rotational direction arrow 22) to second pinion 80 and output roller 90 which rotate around a second horizontal axis 25 in a counterclockwise direction as indicated by arrow 26. The rotational movement of output roller 90 produces a linear output depicted by output arrow 28 on an article being conveyed (not shown). As will be described later, bolt 82 defines the second axis 25 of rotation for output roller 90.

In FIG. 4, output roller 90 is shown rotated 90 degrees around the vertical or first axis 21 in the clockwise direction from the position of FIG. 3. This rotation changes the direction of the output linear motion by about 90 degrees to the new direction indicated by output arrow 28. As output roller 90 is rotated about the vertical axis 21, second pinion 80 remains in driving contact with rotating second bevel 76. Second pinion always rotates in the same direction as indicated by arrow 26, regardless of the rotation of the output roller 90 about first axis 21.

Referring to FIGS. 1-4, input roller 65 has axle 64 that is hollow to receive bolt 66 therethrough. Input roller 65, axle 64, and first pinion 70 are rotatably supported by bearings 67 that can have outer races held in bearing bores 38 in shoulders 36. Bolt 66 is disposed through input roller 65, axle 64, first pinion 70, and bearings 67 to engage with threads in nut 68. A rotating assembly is created in first housing 30 comprising axle 64, input roller 65 and first pinion 70 clamped between inner races of the bearings 67 by tightened bolt 66 and nut 68. Bolt 66 defines horizontal axis 23 of rotation, and axle 64, input roller 65, and first pinion 70 can be keyed to rotate together therewith. Bearings 67 may be any suitable bearings, such as conventional sealed ball or roller bearings with inner and outer races.

Output roller 90 has an axle 92. Bearings 84, output roller 90, axle 92, seals 86, and second pinion 80 mount over bolt 82, and are rotatably supported by outer races of bearings 84 held within bearing bores 38 in second housing 40. Nut 88 threads onto bolt 82, and when tight, creates a rotating assembly in the second housing 40 comprising axle 92, output roller 90 and second pinion 80 clamped between inner races of bearings 84 rotatable around first axis 26 of rotation. When assembled, output roller 90 is embedded into the upper bore 42b of second housing 40 of the body of transmission 20 with an exposed portion 91 of output roller 90 extending out of the second housing 40 of the body of the transmission. Bearings 84 may be any suitable bearings, such as conventional sealed ball or roller bearings with inner and outer races. Seals 86 mount on axle 92 on either side of output roller 90, and can be constructed from an elastomer. Axle 92 can be hollow to receive upper bolt 82 axially therethrough.

First bevel 72, coupling 74, and second bevel 76 rotate about the vertical or first axis 21 of rotation, and are rotatably supported within transmission 20 by upper bearing 69 and lower bearing 71. Bearings 69, 71 can be identical, can be sealed ball or roller bearings with inner and outer races, but are not limited thereto. An outer race of lower bearing 71 is held in first housing 30 and an outer race of upper bearing 69 is held in the sleeve bore 51 of flange sleeve 50. In FIG. 20, fastener 78 extends through second bevel 76, bearing 69, coupling 74, bearing 71, and first bevel 75. Nut 79 threads onto fastener 78 and when tight, clamps the second bevel 76, inner race of bearing 69, coupling 74, inner race of bearing 71 and first bevel 72 together into a rigid rotatable structure held within transmission 20.

FIGS. 5-12 illustrate debris control structures 98 of transmission 20. The debris control structures 98 are configured to either control debris migration into the transmission or to prevent damage to internal gearing in the event of a jam. As described previously, roller 90 is embedded into the upper bore 42b of second housing 40 of the body of transmission 20 with an exposed portion 91 of the output roller 90 extending out of the second housing 40 of the body. Cap 100 may be a debris control structure 98 that covers the upper bore 42b of second housing 40 and seals with land 41 of second housing 40 to form a debris control structure 98 to control egress of debris between second housing 40 and cap 100. One debris control structure 98 may be cap 100 that defines a top surface 101 of transmission 20, with an exposed portion 91 of the output roller 90 extending through at least one opening 102 in the cap 100. The at least one opening 102 can conform closely to the roller 95 and minimizes the gap therebetween.

Cap 10 covers the larger stepped bore 42b of second housing 40 and seals with land 41 to form a debris control structure 98 to control ingress of debris into transmission 20. Cap 10 has a top surface 101 which defines a top surface of the transmission 20 with an exposed portion 91 of the output roller 90 extending through at least one opening 102 in cap 100. The exposed portion 91 of the output roller 90 extends above top surface 101 of cap 100. The exposed portion 91 of output roller 90 defines a conveying surface to contact and move articles along the conveying surface. Upper bore 42b of second housing 40 is covered by cap 100 sealing with land 41 forming a debris control structure 98 to control ingress of debris into transmission 20. Openings 102 can conform closely to an arcuate periphery 95 of output roller 90 to minimize gap therebetween, and portions of the at least one opening 102 can be arcuate and/or angled to more closely match with arcuate periphery 95 of output roller 90 (see opening walls 103 in FIG. 8). Angled opening walls 103 can be tangent to the adjacent arcuate periphery 95 of the output roller 90. Providing the narrowest possible gap between arcuate output roller 90 and matching the opening 102 to the arcuate surface of output roller 90 controls migration of debris into transmission 20. For example, when the gap between output roller 90 and opening 102 is small, large debris particles are prevented from passing therebetween. Clips 110 mount in side openings 43 of second housing 40. Cap 100 is secured to the second housing 40 by placing fasteners 114 through holes in cap 100 and rotatably engaging fasteners 100 with one of the clip holes 112.

Figure 5:
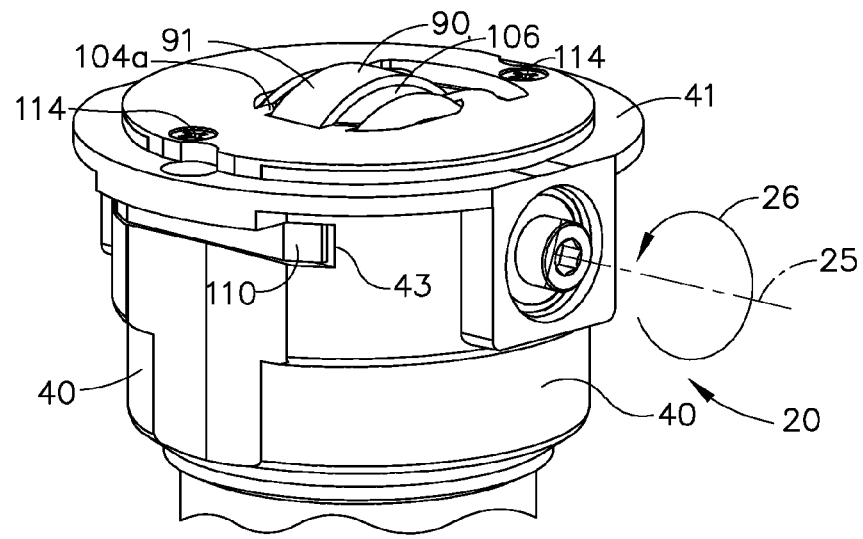
FIG. 5 is a partial perspective view of the variable output orientation transmission of FIG. 1 constructed in accordance with the teachings of the present innovation.
Figure 6:
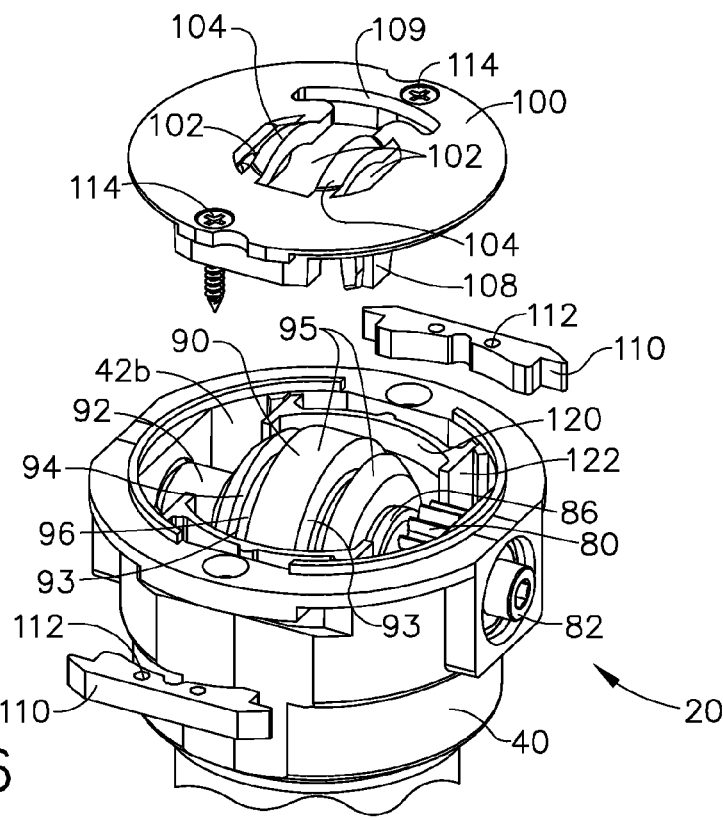
FIG. 6 is a partial exploded perspective view of the variable output orientation transmission of FIG. 5 with cap and clips exploded therefrom constructed in accordance with the teachings of the present innovation.
Figure 7:
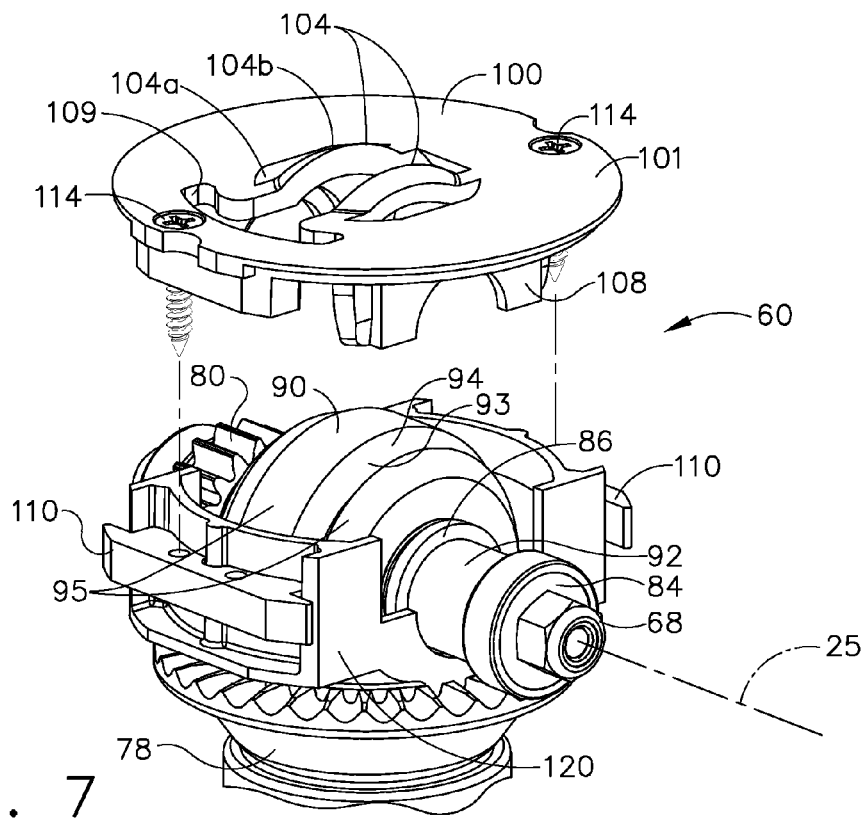
FIG. 7 is an alternate angle perspective view of FIG. 6 with an upper housing removed to show components within constructed in accordance with the teachings of the present innovation.

In FIGS. 5 and 6, output roller 90 is shown embedded in transmission 20. In FIG. 7, second housing 40 is removed for clarity to show shell 120 mounted under output roller 90. Axle 92 extends from both sides of output roller 90 along axis 25. Seals 86 mount on both sides of output roller 90. Shell 120 is a debris control structure 98 comprising an arcuate cup (see FIG. 2) that mounts into upper bore 42b below output roller 90. Shell 120 provides a bather to debris migration into nearby gears such as second pinion 80 and the second bevel 76. Flat walls 122 extend upwards along two sides of shell 120 with semi-circular cutouts 124 therein to allow axle 92 to pass therethrough. Cap 100 further comprises a pair of arches 108 extending downward therefrom configured to interlock with flat walls 122 of shell 120. The interlock of cap 100 and shell 120 completely surround or encapsulate the arcuate periphery of output roller 90 inside an encapsulation 99 with the exception of portions of axle 92. Arches 108 further comprise semi-circular cutouts 105 for axle 92 with seal grooves 107 surrounding each cutout (see FIG. 8). Seal grooves 107 also extend into side walls 122 of shell 120 so that when shell 120 and cap 100 interlock, semi-circular cutouts 105 and 124 combine to create circular openings for axles 92 to pass therethrough with seal grooves 107 circumferentially located therearound. When cap 100 and shell 120 are assembled together, seals 86 fit into and engage with seal grooves 107 to form another debris control structure 98. Seals 86 create a seal between rotating axle 92 and fixed seal grooves 107. Both ends of axle 92 extend from the assembly of cap 10 and shell 100, and seals 86 prevent debris migration about the rotating axles 92.

Output roller 90 may further comprise at least one annular groove 93 therein (see FIGS. 6 and 10) with each groove 93 concentrically located around axle 92 and second axis 25. Groove 93 can comprise groove walls 94 perpendicular to the second axis 25 of rotation, and may include a flat groove floor 96 concentric to the second axis 25.

Cap 100 may further comprise stripper 104 extending at least partially into groove 93. The combination of the groove 93 and the stripper 94 comprise another debris control structure 98. Each stripper 104 is configured to engage with a groove 93 to remove debris from rotating output roller 90. Stripper 104 can enter groove 93 just below exposed portion 91, and at the same level of top surface 101. Tape or paper debris on output roller 90 is rotated into contact with stripper 104. The contact of the moving debris with the stationary stripper 104 exerts a force F on the debris normal to an upper surface of stripper 104 (see FIG. 10). The impact of debris on stripper 104 exerts a force vector on the debris that is both opposite of the rotational direction of the roller 90, and radially away from the rotating output roller 90. The combination of backwards force and outward radial force strips or removes debris from within grove 93, and/or or strips tape attached to the outer arcuate periphery 95 of outer roller 90 (see FIGS. 9 and 10). Stripper 104 is also effective on removing tape wound around output roller 90 and in groove 93. Strippers 104 can also conform closely to groove walls 94 and/or groove floor 96 of output roller 90 to minimize gap therebetween and to increase stripping effectivity.

Figure 8:
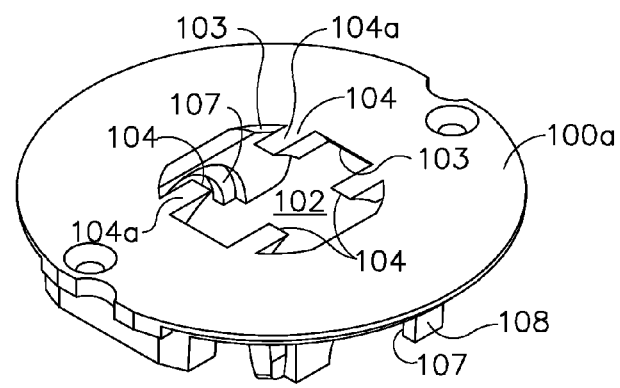
FIG. 8 is a perspective view of an alternate embodiment of the cap of FIG. 7 constructed in accordance with the teachings of the present innovation.
Figure 9:
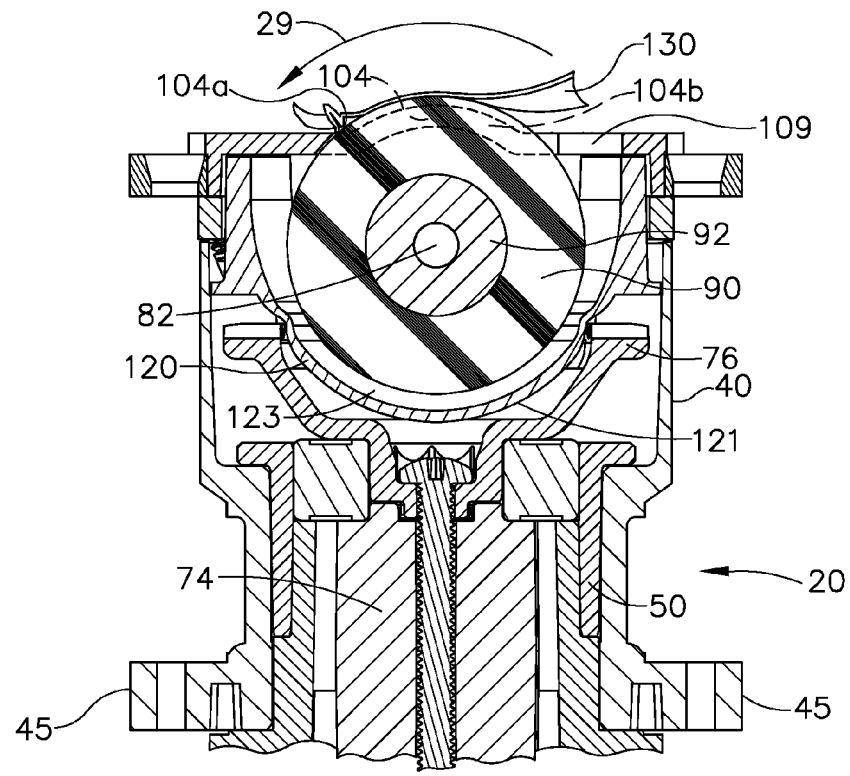
FIG. 9 is partial cross-sectional perspective view of the transmission of FIG. 1 taken along line 29-29 of FIG. 1.
Figure 10:
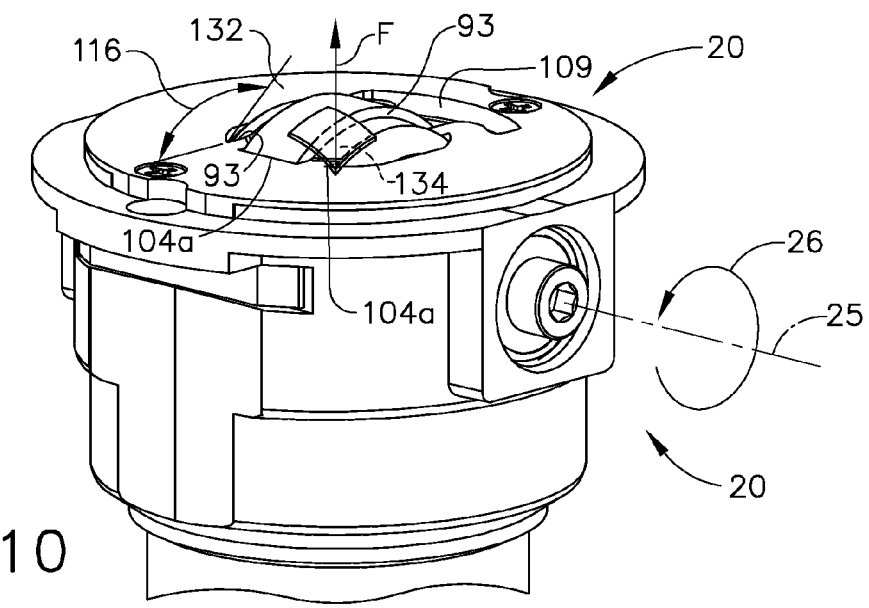
FIG. 10 is a perspective view of the cap of FIG. 7 on the variable output orientation transmission showing debris thereon constructed in accordance with the teachings of the present innovation.

As shown in FIGS. 7-12, stripper 104 may comprise a flat portion 104a level with top surface 101, and/or an arcuate portion 104b rising above the flat portion 104a. FIGS. 8 and 10 illustrates an alternate cap 100a comprising strippers 104 with cantilever flat portions 104a extending into opening 102. FIGS. 7, 9, and 11-12 illustrate strippers 104 that are attached at two ends with flat portions 104a and arcuate portions 104b. Strippers 104 connected at two ends are stronger and less likely to break, especially when stripping large pieces of tape debris. Top surface 101 of cap 100 can extend across flat portion 104a and arched portion 104b of strippers 104.

FIG. 9 is cross section of transmission 20 taken along lines 29-29 (see FIG. 1). FIG. 9 is a view directly along second axis 25 and shows tape 130 being stripped from output roller 90. Output roller 90 and attached tape 150 are rotating clockwise. In FIG. 9, a leading edge of tape 130 has impact the stripper 104 causing the leading edge to crinkle and lift away from output roller 90. Continued rotation of output roller 90 will strip tape 130 from output roller 90. FIG. 9 also illustrates the flat portion 104a and the arcuate portions 104b of strippers 104. Arcuate portions 104b are positioned below the arcuate periphery 95 of output roller 90 to ensure that the exposed portions 91 of output roller 90 contacts and convey articles.

FIG. 10 illustrates roller 90 with a piece of paper debris 132 partially jammed into first groove 93 and a piece of clear tape 134 stuck on arcuate periphery 95 of output roller 90, and over second groove 93. Both paper debris 132 and clear tape 134 are rotating in the direction of arrow 29 towards cap 100a where strippers 104 are short cantilever portions 104a. Cantilever stripper 104a is shown just contacting a corner of clear tape 134 and force F is beginning to strip tape 134 from output roller 90. As best shown in FIG. 10, debris traveling with the arcuate roller impacts the top surface 101 of strippers 104 at an oblique angle 116. Oblique angle 116 can be greater than 90 degrees.

Figure 11:
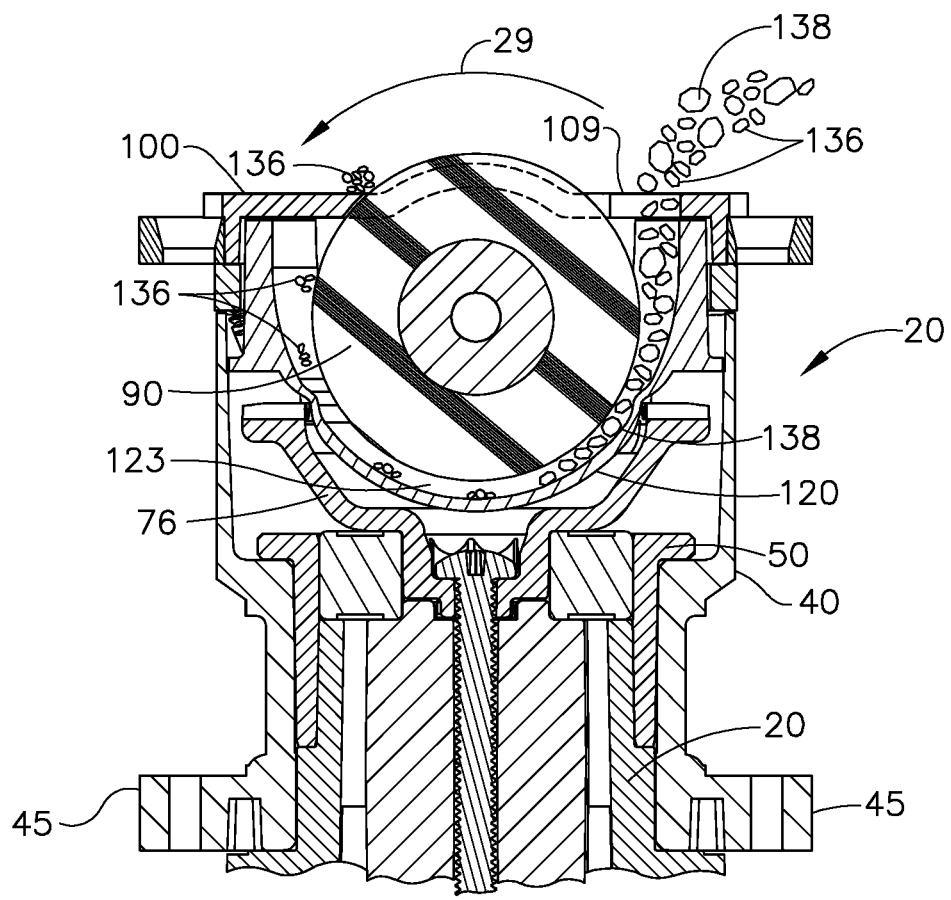
FIG. 11 is a partial cross-sectional perspective view of the transmission of FIG. 9 taken along line 29-29 of FIG. 1 showing debris being ejected from the transmission in accordance with the teachings of the present innovation.

FIG. 11 is another partial cross sectional view of transmission 20 showing an additional debris control structure 98 configured to eject debris from transmission 20. Previously described shell 120 can be seen in this view in cross section and in close proximity to an underside of the arcuate periphery 91 of output roller 90. Shell 120 has a cupped portion 121 about an underside of the arcuate periphery 91 with a narrow gap therebetween, the narrow gap between the underside of the arcuate roller 90 and the cupped portion 121 of the shell 120 forms a plenum 123. The plenum 123 can be configured to channel airflow thrown off the arcuate roller 90 upwards from the spinning output roller 90 by guiding the air between the spinning roller and the cupped portion 121 of shell 120. Paper debris 136 can be composed of loosely compacted clumps of short paper fibers and dust that can be pulled into transmission 20 by rotating output roller 90. Paper debris 138 can be larger pieces of paper or tape debris. When debris 136, 138 migrates into the encapsulation 98 and into the plenum 123, the airflow in the plenum 123 ejects the debris 136 carried therein upwards and out of an exhaust opening 109 on a backside of the output roller.

For larger pieces of debris 138, the gap between the output roller 90 and the cupped portion 101 is sized to bring the larger pieces of debris 138 into contact with the rotating output roller, the contact ejecting the larger pieces of debris 138 upwards from the plenum 123 with the contact. The exhaust opening 109 on the backside of the roller is positioned to exhaust the larger pieces of debris 138 ejected by contact with the rotating roller.

The ejection of larger pieces of debris 138 from transmission 20 can be assisted by airflow thrown off of rotating output roller 90. Tape can stick to output roller 90 and can be drawn underneath of the rotating output roller and the shell. Friction of the output roller 90 on the tape debris can wear and abrade the tape into small fragments, and the fragments eject from the exhaust 109.

Figure 12:
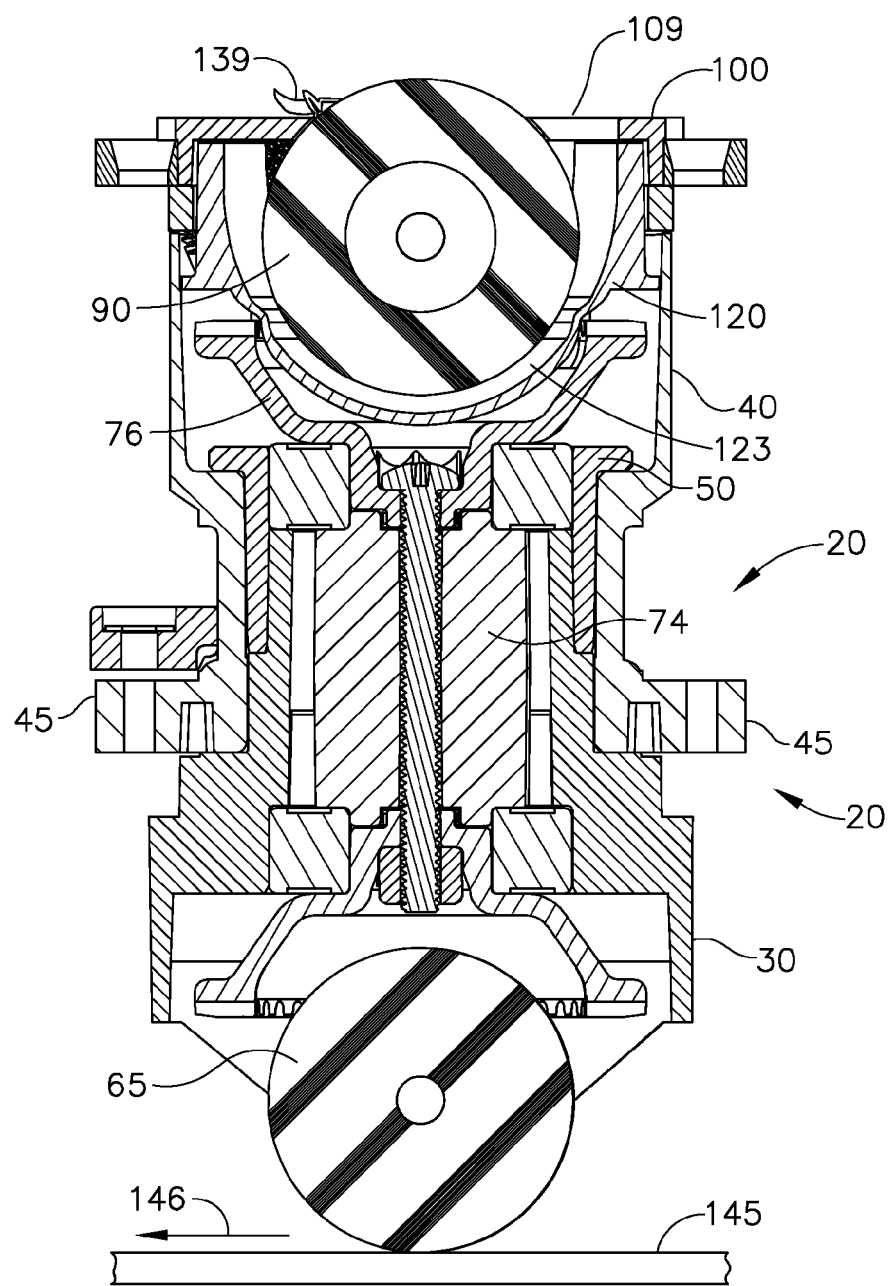
FIG. 12 is a cross-sectional perspective view of the transmission of FIG. 1 taken along line 29-29 of FIG. 1 showing the transmission jammed by debris and with a lower input roller slipping on linearly moving belt accordance with the teachings of the present innovation.

FIG. 12 is another partial cross sectional view of transmission 20 showing an additional debris control structure 98 that prevents damage to gears within transmission 20. In the event of a jam that brings output roller 90 to a halt, high forces can be transferred to the gears in the drivetrain 60. In this view, tape wad 139 has jammed between cap 100 and output roller 90 and has stopped the rotation of output roller 90. Output roller 90 can be formed from an elastomer with a high coefficient of friction to drive articles along the conveying path. Input roller 65 can be formed from steel to have a lower coefficient of friction with the linearly moving belt 145 than the elastomeric output roller 90 has with the articles. In the event of a jam, such as that caused by tape wad 139, output roller 90 and input roller 65 both stop rotating. The coefficient of friction between the steel of input roller 65 and linear moving belt 145 is low enough to enable the stopped input roller 65 to slip thereon. The steel of input roller 65 is configured to slip on linear moving belt 145, and hard enough to prevent linear moving belt 145 from wearing a flat spot on input roller 65.

Figure 13:
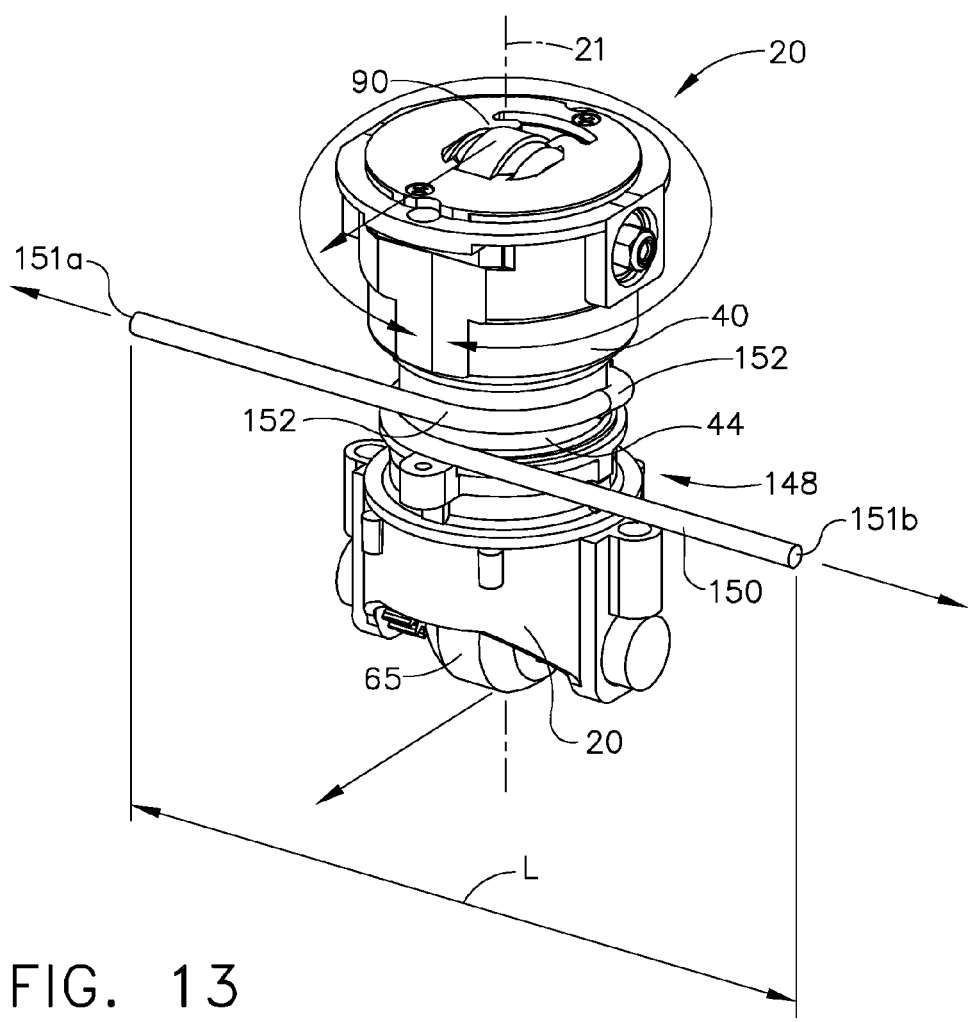
FIG. 13 is a diagrammatic perspective view of a cable divert mechanism that engages with the transmission to rotate the output roller about the first axis of rotation constructed in accordance with the teachings of the present innovation.

FIG. 13 shows a cable divert mechanism 148 that engages with transmission 20 to rotate output roller 90 about first axis of rotation 21. Cable 150 can be constructed from a long wearing and abrasion resistant material. One example thereof, but not limited thereto, is a thermoplastic such as UHMW polyethylene which can be woven from high strength molecularly oriented strands for maximum strength and abrasion resistance. One commercially available version of a suitable UHMW cable can be obtained from DSM Dyneema, Highway 27, South Stanley, N.C. 28164, but the innovation is not limited thereto.

In FIG. 13, a single transmission 20 is shown having first housing 30 held stationary with a second housing 40 rotatable around the first housing 30 to define a first axis of rotation 21. Output roller 90 is attached to second housing 40 to define a conveying surface, output roller 90 being rotatably driven by engagement of the transmission 20 with a power source (such as linear moving belt 145) to move articles along the conveying surface. Second housing 40 has an outer periphery around the first axis 21. Cable 150 is looped 152 around outer periphery 44 of second housing 40 with tension applied to first cable end 151a and second cable end 151b in opposite directions to hold the first and second cable ends 151a, 151b apart a spaced apart distance "L", wherein when cable ends 151a, 151b remain at the spaced apart distance "L" and are moved in unison to move first cable end 151a closer to the transmission 20 and second cable end 151b farther away from transmission 20, the movement of cable 150 looped 152 about outer periphery 44 of the transmission rotates upper housing 40 and output roller 90 to divert articles from the first direction to the second direction different from the first direction.

Figure 14:
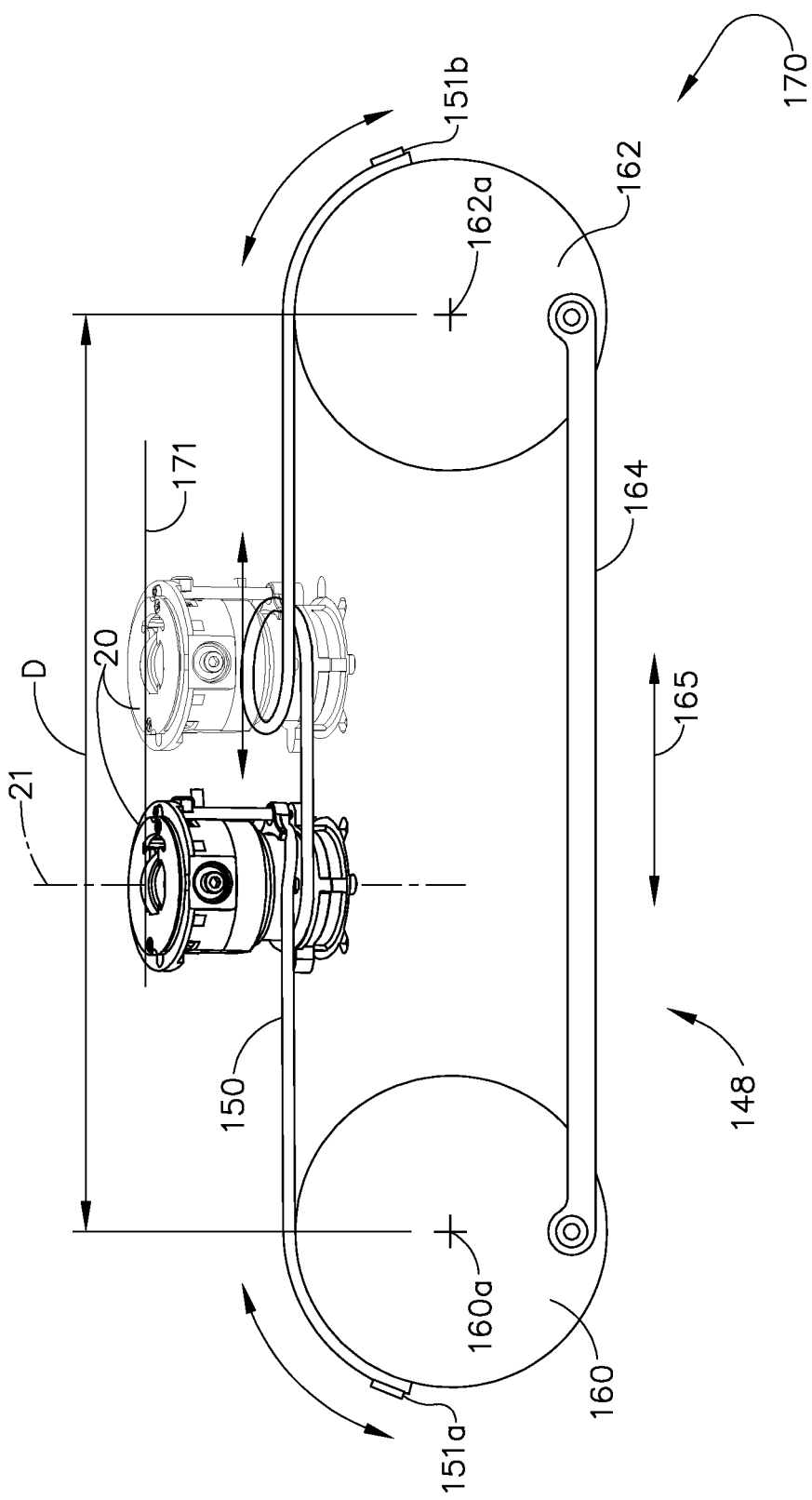
FIG. 14 is a schematic side view of the cable divert mechanism of FIG. 13 with drums and an actuator to rotate the output roller constructed in accordance with the teachings of the present innovation.

FIG. 14 shows a second embodiment of a cable divert mechanism 148 comprising table 170 with first drum 160 and a second drum 162 rotatably connected to the table with each drum 160, 162 having the same diameter. First and second drums 160, 162 are held a fixed distance "D" apart and are free to rotate around respective axis 160a, 162a. First end of the cable 151a connects to first drum 160 and second end 151b of cable 150 connects to second drum 162. Rotation of first drum 160 and second drum 162 in a first direction and in the same amount rotates upper housing 40 and output roller 90 to divert conveyed articles from the first direction to the second direction.

Transmission 20 is shown fixed to table 170 between first and second drums 160, 162 with tension maintained on first and second cable ends 151a, 152b. The length "L" between cable ends 151 comprises the portions of cable 150 wrapped partially around first drum 160 and partially around second drum 162, and the cable length portion strung between first and second drums 160, 162. Cable 150 is wrapped around and in engagement with outer periphery 44 of second housing 40 and in frictional and constrictional engagement therewith. A positioner rod 164 can be pivotally connected between first drum 160 and second drum 162 as shown. Side to side movement (see arrow 165) of positioner rod 164 rotates each drum in the same rotational direction and the same amount. As first and second drums 160, 162 rotate in the same direction and the same amount, one drum 160 or 162 pays out (unwraps) an amount of wrapped cable 150 and the other drum 160, or 162 takes up (wraps) an equal amount of cable 150 rotating first housing 40 and output roller 90 around the first axis 21. Reversing the movement of positioner rod 164 rotates the upper housing 40 and output roller around the first axis 21 in opposite second rotational direction. More than one transmission 20, such as a single linear row of transmissions 20, can be placed between first drum 160 and second drum 162, with each transmission 20 operably coupled to the cable 150 with the loop 152 described previously. Rotation of first drum 160 and second drum 162 rotates each second housing 40 and output roller 90 in the row of transmissions 20. Transmission 20 is shown extending through upper surface 171 and first and second rollers 160, 162 attached to table 170. The above embodiment can be used whenever a single row of transmissions is used in a table 170.

Figure 15:
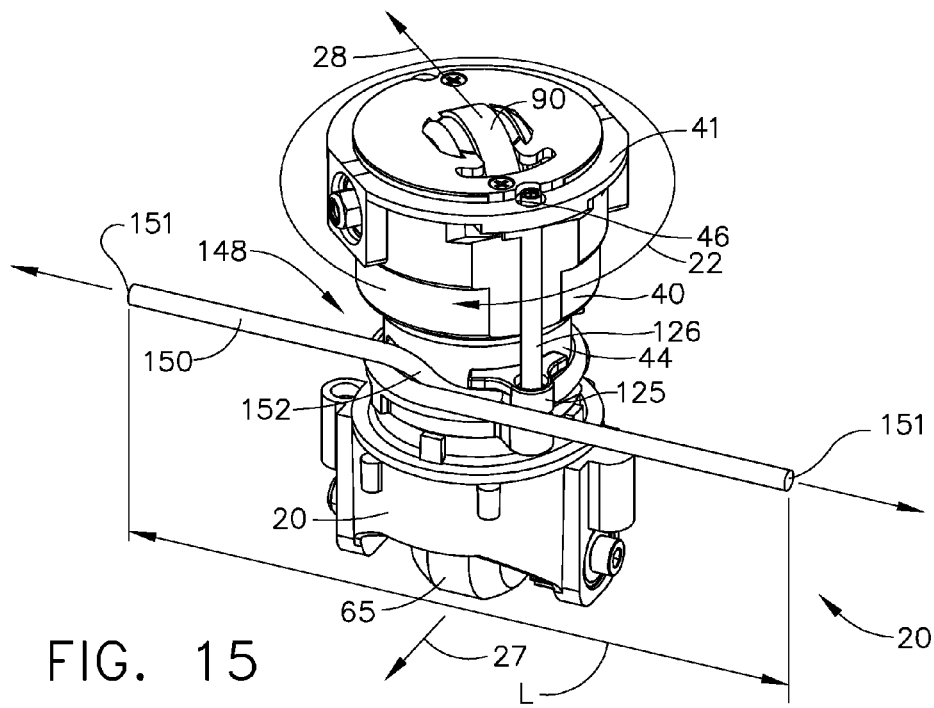
FIG. 15 is a perspective view of the cable divert mechanism of FIG. 13 with the transmission rotated in a first direction to a first position constructed in accordance with the teachings of the present innovation.

In FIG. 15, the output roller 90 and second housing 40 are shown rotated around first axis 21 in a clockwise direction (arrow 22) about 135 degrees from the position shown in FIG. 13. Output arrow 28 shows the direction of movement of an article being driven by rotating output roller 90. Input arrow 27 indicates the direction of linear motion applied to input roller 65. As shown, ends 151 of cable 150 have moved to the left relative to transmission 20 to rotate the upper housing 40 and output roller 90 clockwise (arrow 22). The distance "L" between ends 151 remains the same. A cable clamp 125 has rotated into view from the backside of second housing 40 and is shown clamping cable 150 between cable clamp 125 and clamp boss 45 of upper housing 40. Clamp rod 126 extends through rod bore 46 in land 41 and threadedly engages with upper housing 40. Clamp rod 126 can be tightened with a tool at land 41 to clamp cable clamp 1125 onto cable 150. Cable clamp 126 provides a single clamping point to secure cable 150 to upper housing 40 yet allows cable 150 to wind and unwind on outer periphery 44 of upper housing 40.

Figure 16:
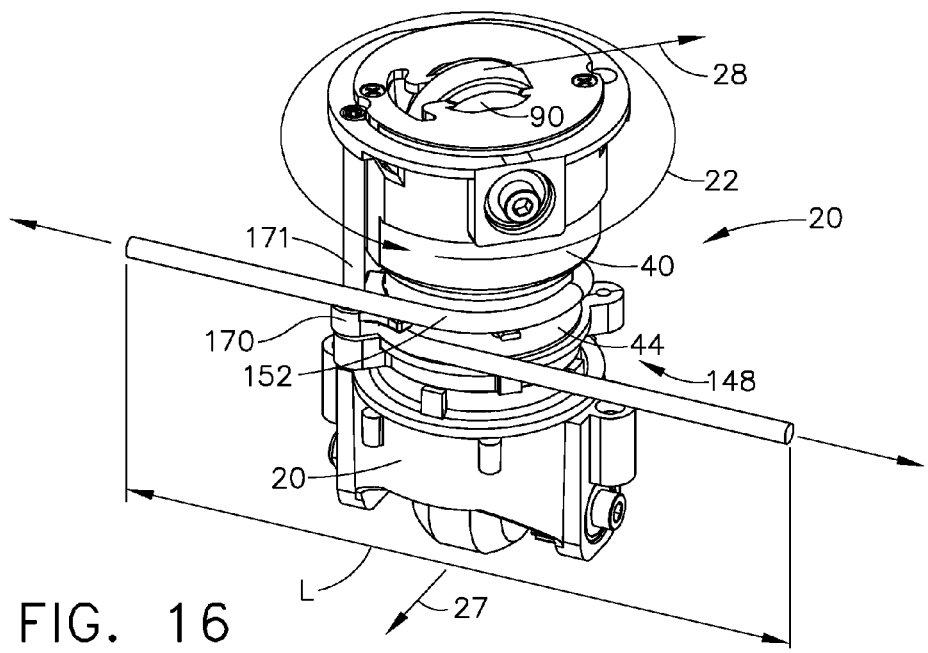
FIG. 16 is a perspective view of the cable divert mechanism of FIG. 13 with the transmission rotated in a second direction to a second position constructed in accordance with the teachings of the present innovation.

FIG. 16 illustrates the counterclockwise rotation of upper housing 40 and output roller 90 from the position shown in FIG. 13 to the position shown in FIG. 16. Once again, ends 151 of cable 150 remain the same distance "L" apart but move to the right relative to transmission 20. The rotational difference between FIG. 13 and FIG. 15 is plus 135 degrees around first axis 21, and the rotational difference between FIG. 13 and FIG. 16 is minus 135 degrees around the first axis 21. Between FIGS. 13, 15, and 16, the total rotation depicted is +/135 degrees for a full 270 total degrees of rotation of output roller 90 and upper housing 40. It is believed that up to 360 degrees of rotation or more is possible with cable divert mechanism 148 and transmissions 20.

FIGS. 17-19 depict another embodiment of a cable divert mechanism 148 wherein the output rollers 90 of two rows of transmissions 20 can be rotated about each transmission's 20 first axis 21 with a single cable 150. In FIGS. 17-19, cable 150 is consecutively looped 152 around a first row of transmissions 20 and wrapped 180 degrees around cable pulley 180 to loop 152 around a second row of transmissions 20 that are parallel to the first row of transmissions 20. Cable ends 151a and 151b can be attached to separate drums, or to a windlass 178 comprising two drums joined together on a common windlass axle.

The cable divert mechanism 148 of FIGS. 17-19 can comprise table 170 having upper surface 171 with two rows of a plurality of transmissions 20 extending therethrough. Each row of transmissions 20 is parallel to the other, with each transmission 20 having a first housing 30 fixed to the table, and each transmission 20 having a second housing 40 rotatable around the first housing to define a first axis of rotation 21. The second housing 40 having an output roller 90 to define the conveying surface and an outer periphery around the first axis 21. Windlass 178 is rotatably supported by table 170 at one end of the two rows of transmissions 20. Cable 150 is attached to windlass 178 at first end 151a and looped 152 sequentially around the outer periphery 44 of each of the first row of transmissions 20, the cable 150 curved around cable pulley 180 to return towards windlass 178 while looping 152 sequentially around the outer periphery 44 of each of the second row of transmissions 20 parallel to the first row with second end of the cable 151b attached to windlass 178 to place cable 150 under tension. Rotation of windlass 178 rotates each of the second housings 40 and output rollers 90 with cable 150 to divert articles carried on the conveying surface from the first direction to the second direction where the second direction is different from the first direction.

The output roller 90 is rotatably driven by linear moving belt 145 to move articles along the conveying surface. The second housing 40 has an outer periphery 44 around the first axis 21. Windlass 178 is rotatably supported by table 170 at one end of the two rows of transmissions 40. Cable 150 is attached to the windlass 178 at first end 151a and looped 152 sequentially around the outer periphery 44 of each of the first row of transmissions 20. The cable 150 is curved around cable pulley 180 to return towards windlass 178 while looping 152 sequentially around the outer periphery 44 of each of the second row of transmissions 40 parallel to the first row of transmissions. Second end 151b of cable 150 is attached to windlass 178 to place cable 150 under tension. Rotation of windlass 178 rotates each of the second housings 40 and drive rollers 90 with cable 150 to divert articles carried on the conveying surface from the first direction to the second direction where the second direction is different from the first direction.

A power source such as linearly moving belt 145 can be provided. A plurality of transmissions 20 can be provided for conveying articles thereon. Each of the plurality of transmissions 20 comprises output roller 90 embedded into a body (first housing 30, second housing 40, cap 100) of the transmission 20 with an exposed portion 91 of the output roller 90 extending above a top surface 101 of the transmission to define the conveying surface. Each output roller 90 is rotatable about first axis 21 of rotation perpendicular to the conveying surface to move articles from the first direction to the second direction. The output roller 90 of each transmission is rotated by the power source (linearly moving belt 145) about second axis 25 of rotation parallel to the conveying surface to convey articles carried thereon along the conveying surface, wherein the transmission 20 further comprises a debris control structure 98 about the output roller 90 below the top surface 101 to control debris migration into the transmission.

FIGS. 17-19 show a partial corner portion of the previously mentioned table 170 configured to mount the plurality of transmissions 20 therein. As shown, table 170 has upper surface 171 and as indicated by roller bores 172 therein, can contain the plurality of transmissions 20 spaced apart in parallel rows to form a grid. As indicated by first row of roller bores 172a and second row of roller bores 172b, adjacent rows of transmissions can be staggered. To reveal details underneath through roller bores 172, only one transmission 20 of the plurality is depicted. As shown, top surface 101 of cap 100 of transmission 20 is at or about the same level of upper surface 171 and can be substantially flat. Exposed portion 91 of the plurality of output rollers 90 extends above top surface 101 of cap 100 to define the conveying surface for conveying and diverting articles on table 170.

Baseplate 175 attaches to a pair of generally parallel rails 176 (one shown) to make a rigid structure that supports linear moving belt 145 and a plurality of standoffs 177. Arrow 146 indicates the direction of motion of linear moving belt 145 which is driven by a power source (not shown). Upper surface 101 removably attaches to the baseplate 175 by attaching to the plurality of standoffs 177 which space top surface above baseplate 175. Positioner bracket 166 attaches to rail 176. Cable divert mechanism 148 can be seen between the baseplate 175 and the upper surface 171, and attached to rail 176.

The embodiment depicted in FIG. 14 is configured to rotate the output rollers in one row of transmissions 20. In FIGS. 17-19, the cable divert mechanism 148 depicted in FIG. 14 is configured to rotate drive rollers 90 in more than one row of transmissions 20 with the cable 150. Cable divert mechanism 148 rotates all drive rollers 90 residing in the first row of roller bores 172a, and all drive rollers 90 in the second row of roller bores 172b, about each respective first axis 21. To interconnect transmissions 20 in the first row, cable 150 is fed in from rail 176, and starting with the transmission 20 closest to the rail 176, the cable 150 is sequentially looped 152 around each of the plurality of transmissions 20 in turn, and then bent 180 degrees around reversing cable pulley 180. Cable pulley 180 rotates freely and attaches to baseplate 175. Cable 150 then returns by being looped 152 around each of the transmissions 20 in the second row, and exits adjacent to rail 176. Each end 151 of cable 150 is wrapped in an opposite direction around windlass 178 that is rotatably supported by windlass axles 178a in positioner bracket 166. Ends 151 of cable 150 are constrained by locking bar 179 that clamps cable 150 to windlass. In FIG. 17-20, the foremost end of cable 150 wraps under windlass 178. Cable 150 wraps around cable pulley 180 to vertically engage cable 150 with windlass 178. As windlass 178 rotates, cable 150 is both taken up and paid out to rotate two rows of output rollers 90. When the windlass 178 rotates around the windlass axle 178a in a first windlass direction, the first end 151a of the cable unwraps an amount of cable 150 from the windlass 178 and the second end 151b of the cable 150 wraps the same amount of cable 150 onto the windlass 178. Windless 178 is operably coupled to linear actuator 164 comprising a dual action cylinder. As depicted, actuator 164 can rotate windlass 178 in a selected direction around windlass axle 178a.

In FIG. 17, the output rollers 90 are shown oriented to feed articles conveyed thereon in a first direction indicated by arrow 183. The locking bar 179, windlass 178, actuator 164, drive rollers 90, and cable ends 151 are all depicted in a first position that will feed articles in a first path direction indicated by arrow 183. In FIG. 18, the actuator 164 has shortened, windlass 178, locking bar 179, and cable ends 151 have rotated clockwise, and output rollers are positioned to drive articles in a second path direction indicated by arrow 185. For this example, actuator 164 can cycle to position output rollers 90 of the plurality of drives 20 to feed articles on the first path direction 183 or the second path direction 185, respectively.

FIG. 19 is a partially exploded view showing upper surface 171 exploded upwards from standoffs 177 to expose transmissions 20 mounted in baseplate 175. With upper surface 171 removed, cable 150 can be wrapped around the plurality of transmissions 20. Input roller 90 of transmissions 20 are rotating from contact with the linearly moving belt 145. Linear moving belt 145 is moving in the direction of arrow 146. The lower or first housing 30 of each transmission 20 is attached to baseplate 175 with fasteners 37 engaging with mounting bosses 39 (see FIG. 2). Cable pulley 180 is shown elevated above the attachment point on baseplate 175. Cable 150 is shown with a plurality of loops 152 therein to show how cable 150 wraps around transmissions 20 in the first and second rows of transmissions. Arcuate cable portions near ends 151 show how cable 150 is wrapped around the windlass 178 in the first path direction indicated by arrow 183 in FIG. 17. Whereas a corner of table 170 is shown, table 170 can be much larger, rectangular, and can include additional rows of transmissions 20. Windlass 178 can be extended and additional cables 150 can be attached thereto to rotate the additional rows of transmissions.

The foregoing description has been presented for purposes of illustration and description. It is not intended to be exhaustive or to limit the innovation to the precise form disclosed. Obvious modifications or variations are possible in light of the above teachings. The embodiment was chosen and described in order to illustrate the principles of the innovation and its application to thereby enable one of ordinary skill in the art to utilize the innovation in various embodiments and with various modifications as are suited to the particular use contemplated. Although only a limited number of embodiments of the innovation is explained in detail, it is to be understood that the innovation is not limited in its scope to the details of construction and arrangement of components set forth in the preceding description or illustrated in the drawings. The innovation is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the innovation be defined by the claims submitted herewith.

The invention claimed is:

1. A divert for diverting articles conveyed thereon from a first path to a second path, the divert comprising:
   a table having an upper surface;
   a source of power attached to the table,
   a plurality of transmissions each comprising a fixed portion attached to the table and a rotatable portion having an output roller extending above the upper surface to define the conveying surface, each output roller rotatably driven by the power source around a roller axis parallel to the conveying surface and each output roller rotatable around a first axis perpendicular to the conveying surface by rotation of the rotatable portion around the first axis; and
   a cable divert mechanism having an actuator attached to the frame and a cable operatively attached to the actuator and to the rotatable portion of each transmission, the cable divert mechanism synchronizedly holding each output roller in a first orientation to convey articles along the first path,
   wherein when the actuator actuates and the cable moves, each of the rotatable portions and the respective output rollers synchronously rotate around the first axis to divert articles onto the second path.

2. The divert of claim 1 wherein the actuator comprises a positioner rod linking the first drum to the second drum, wherein movement of the positioner rod rotates each of the first and second drums the same direction and the same amount.

3. The divert of claim 1 wherein the each rotatable portion of the transmission has an outer periphery with the cable looped-around the outer periphery to synchronously rotate each rotatable portion and output roller around the first axis in response to movement of the cable.

4. The divert of claim 3 wherein the rotatable portion of each transmission further comprises a cable clamp rotatable therewith clamped to the cable at a single clamping point to secure the cable to the rotatable portion, the cable clamp positioned to allow the cable to wind and unwind on the outer periphery as the cable moves in response to the actuator.

5. The divert of claim 1 further comprising a first drum and a second drum rotatably connected to the table with cable ends attached thereto, wherein rotation of the first drum and the second drum moves the cable to synchronizedly rotate each rotatable portion and the output roller to divert articles from the first path to the second path.

6. The divert of claim 5 wherein rotation of the first drum and the second drum together in an opposite direction rotates the upper housing and the output roller in an opposite direction.

7. The divert of claim 5 wherein the actuator operably connects to each of first and second drums, wherein actuation of the actuator rotates both first and second drums to divert articles from the first direction to the second direction.

8. The divert of claim 7 wherein the actuator is an air cylinder.

9. A conveying surface for selectively conveying articles carried thereon in a first direction and a second direction different from the first direction, the conveying surface comprising:
   a table having an upper surface;
   a source of power;
   a first row and a second row of transmissions each parallel to the other, each transmission having a first housing fixed to the table and a second housing having an outer periphery rotatable around the first housing to define a first axis of rotation perpendicular to the upper surface, the second housing having an output roller rotatably attached thereto to define the conveying surface with the output roller rotatably driven by the power source to move articles along the conveying surface, the second housing having an outer periphery around the first axis; and
   a cable divert mechanism comprising a windlass and a cable pulley is rotatably supported by the table with the first and second rows of transmissions extending therebetween, a cable is attached at each cable end to the windlass and extends therefrom to arc around the cable pulley with the cable consecutively looped around each rotatable portion of each transmission between the windlass and the cable pulley to synchronously orient each output roller to the other in an orientation to move articles along the first path
   wherein rotation of the windlass rotates each of the rotatable housings and output rollers in the same direction to rotate the output rollers from the first orientation to a second orientation to thereby divert articles carried on the conveying surface from the first direction to a second direction different than the first.

10. The conveying surface of claim 9 wherein the first end of the cable is wrapped around the windlass in a first direction and the second end of the cable is wrapped around the windlass in a second direction opposite to the first direction.

11. The conveying surface of claim 9 wherein the cable is secured to the windlass at the first and second cable ends by a clamp.

12. The conveying surface of claim 9 wherein the windlass is rotatably supported by the table to rotate around a single windlass axle.

13. The conveying surface of claim 9 wherein the upper housing further comprises a cable clamp clamping the cable to the upper housing.

14. The conveying surface of claim 9 wherein when the windlass rotates around the windlass axle in a first windlass direction, the first end of the cable unwraps an amount of cable from the windlass and the second end of the cable wraps the same amount of cable onto the windlass.

15. The conveying surface of claim 14 wherein the table comprises windlass is rotated by an actuator.

16. The conveying surface of claim 15 wherein the actuator is linear with one end connected to the table and the other end connected to the windlass, the windlass rotating in response to linear movement of the actuator.

17. The conveying surface of claim 9 wherein the table further comprises a baseplate beneath the upper surface.

18. The conveying surface of claim 17 wherein each of the first housings of the transmissions are fixed to the baseplate.

19. The conveying surface of claim 18 wherein each of the transmissions fixed to the baseplate further comprise an input roller extending beneath the baseplate, engaging a drive train rotatably coupling the input roller to the output roller.

20. The conveying surface of claim 19 wherein a linearly moving belt is attached to the table beneath the baseplate with each of the input rollers in driving connection with the linear moving belt to rotatably drive the output rollers.

* * * * *